(12) United States Patent
Gotou et al.

(10) Patent No.: US 8,053,083 B2
(45) Date of Patent: Nov. 8, 2011

(54) LAYERED STRUCTURE AND ITS MANUFACTURING METHOD

(75) Inventors: Hiroshi Gotou, Kobe (JP); Mototaka Ochi, Kobe (JP); Yuichi Taketomi, Kobe (JP); Nobuyuki Kawakami, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 234 days.

(21) Appl. No.: 12/131,493

(22) Filed: Jun. 2, 2008

(65) Prior Publication Data

US 2009/0004490 A1 Jan. 1, 2009

(30) Foreign Application Priority Data

Jun. 26, 2007 (JP) ................. 2007-168278

(51) Int. Cl.
*B32B 15/04* (2006.01)
*B05D 5/12* (2006.01)

(52) U.S. Cl. ........ 428/469; 427/123; 428/432; 428/433; 428/434

(58) Field of Classification Search .................. None
See application file for complete search history.

(56) References Cited

U.S. PATENT DOCUMENTS

| | | | |
|---|---|---|---|
| 5,514,909 | A | 5/1996 | Yamamoto et al. |
| 6,033,542 | A | 3/2000 | Yamamoto et al. |
| 6,096,438 | A | 8/2000 | Takagi et al. |
| 6,218,206 | B1 | 4/2001 | Inoue et al. |
| 6,252,247 | B1 | 6/2001 | Sakata et al. |
| 6,791,188 | B2 | 9/2004 | Hagihara et al. |
| 7,098,539 | B2 | 8/2006 | Gotoh et al. |
| 7,154,180 | B2 | 12/2006 | Gotoh et al. |
| 7,262,085 | B2 | 8/2007 | Gotoh et al. |
| 7,365,810 | B2 | 4/2008 | Gotoh et al. |
| 7,683,370 | B2 * | 3/2010 | Kugimiya et al. ............... 257/59 |
| 2005/0224795 | A1 * | 10/2005 | Gotoh et al. .................... 257/59 |
| 2006/0007366 | A1 * | 1/2006 | Gotoh et al. .................... 349/42 |

(Continued)

FOREIGN PATENT DOCUMENTS

JP 4-20930 1/1992

(Continued)

OTHER PUBLICATIONS

U.S. Appl. No. 12/376,863, filed Feb. 9, 2009, Hino, et al.

(Continued)

*Primary Examiner* — Jennifer McNeil
*Assistant Examiner* — Vera Katz
(74) *Attorney, Agent, or Firm* — Oblon, Spivak, McClelland, Maier & Neustadt, L.L.P.

(57) ABSTRACT

This invention is intended to provide a layered structure in which Al alloy is directly connected to transparent oxide conducting layer without increasing electrical contact resistance between the two, with wiring resistance held low and galvanic corrosion being less likely to occur in developing solution or other electrolyte fluids, and the manufacturing method of such layered structure. The manufacturing method intended to provide such layered structure composed of the Al alloy and the transparent oxide conducting layer directly connected to each other, includes a first process to form the above transparent oxide conducting layer on a substrate, a second process to form, on the transparent oxide conducting layer, an Al alloy layer containing alloy components having less ionization tendency than aluminum, and a third process to heat the above Al alloy layer at a temperature equal to or higher than the temperature at which interchemical compound between aluminum and the above alloy components can be separated out.

20 Claims, 11 Drawing Sheets

U.S. PATENT DOCUMENTS

| | | | |
|---|---|---|---|
| 2006/0091792 A1 | 5/2006 | Kugimiya et al. | |
| 2006/0180250 A1 | 8/2006 | Kugimiya et al. | |
| 2006/0181198 A1 | 8/2006 | Gotoh et al. | |
| 2006/0237849 A1 | 10/2006 | Gotoh et al. | |
| 2006/0275618 A1 | 12/2006 | Kugimiya et al. | |
| 2007/0040172 A1 | 2/2007 | Kawakami et al. | |
| 2007/0040173 A1 | 2/2007 | Kugimiya et al. | |
| 2007/0102289 A1* | 5/2007 | Kato et al. | 204/298.12 |
| 2007/0278497 A1 | 12/2007 | Kawakami et al. | |
| 2008/0081532 A1 | 4/2008 | Okuno | |
| 2008/0121522 A1 | 5/2008 | Ehira et al. | |
| 2010/0163877 A1* | 7/2010 | Hino et al. | 257/59 |

FOREIGN PATENT DOCUMENTS

| | | |
|---|---|---|
| JP | 5-3169 | 1/1993 |
| JP | 6-235933 | 8/1994 |
| JP | 7-45555 | 2/1995 |
| JP | 10-91089 | 4/1998 |
| JP | 11-283934 | 10/1999 |
| JP | 11-284195 | 10/1999 |
| JP | 11-337976 | 12/1999 |
| JP | 11-352515 | 12/1999 |
| JP | 2001-350159 | 12/2001 |
| JP | 2002-299630 | 10/2002 |
| JP | 2002-368202 | 12/2002 |
| JP | 2003-73810 | 3/2003 |
| JP | 2003-273109 | 9/2003 |
| JP | 2004-214606 | 7/2004 |
| JP | 2006-261636 | 9/2006 |
| WO | WO97/13885 | 4/1997 |

OTHER PUBLICATIONS

U.S. Appl. No. 12/355,274, filed Jan. 16, 2009, Kugimiya, et al.
U.S. Appl. No. 12/681,542, filed Apr. 2, 2010, Ochi, et al.
U.S. Appl. No. 12/415,379, filed Mar. 31, 2009, Takagi, et al.
U.S. Appl. No. 12/414,877, filed Mar. 31, 2009, Takagi, et al.
U.S. Appl. No. 12/131,444, filed Jun. 2, 2008, Gotou, et al.
U.S. Appl. No. 12/136,409, filed Jun. 10, 2008, Ochi, et al.
U.S. Appl. No. 12/312,907, filed Jun. 1, 2009, Gotou, et al.
U.S. Appl. No. 12/517,362, filed Jun. 3, 2009, Hino, et al.
U.S. Appl. No. 12/528,008, filed Aug. 20, 2009, Gotou, et al.
U.S. Appl. No. 11/931,336, filed Oct. 31, 2007, Takagi, et al.
U.S. Appl. No. 12/126,527, filed May, 23 2008, Hino, et al.
U.S. Appl. No. 12/172,442, filed Jul. 14, 2008, Takagi, et al.
U.S. Appl. No. 12/812,913, filed Jul. 14, 2010, Ochi, et al.
U.S. Appl. No. 12/918,727, filed Aug. 20, 2010, Miki, et al.
U.S. Appl. No. 12/922,764, filed Sep. 15, 2010, Goto, et al.
U.S. Appl. No. 12/922,965, filed Sep. 16, 2010, Nakai, et al.
U.S. Appl. No. 12/936,572, filed Oct. 6, 2010, Kawakami, et al.
U.S. Appl. No. 12/999,034, filed Dec. 14, 2010, Kawakami, et al.
U.S. Appl. No. 13/056,444, filed Jan. 28, 2011, Onishi, et al.
U.S. Appl. No. 13/122,937, filed Apr. 6, 2011, Nanbu, et al.
U.S. Appl. No. 13/126,126, filed Apr. 26, 2011, Ochi, et al.

* cited by examiner

LAYERED STRUCTURE AND ITS MANUFACTURING METHOD

BACKGROUND OF THE INVENTION

1. Field of the Invention

This invention relates to layered structures used as source electrodes, drain electrodes, and other electrodes of thin-film transistors, reflecting electrodes, wiring for connection between these electrodes, storage capacitor electrodes, and common electrodes used in thin-type display devices, and the manufacturing method of such layered structures.

2. Description of the Related Art

Because of low specific resistance and easy workability, Al alloys are used as thin-film materials for wiring film, electrode film, reflecting electrode film, storage capacitor electrode film, and common electrode film in the fields of liquid display devices, plasma display devices, electroluminescence display devices, field-emission display devices, and other flat panel display devices (FPD).

For example, Japanese Patent Application Laid-open Publication No. 11-352515 describes a layered structure in which a layer of Al alloy, a low-resistance metal, is formed over ITO layer or transparent oxide conducting layer.

As to the electrical characteristic of such layered structures, the electrical resistivity of the Al alloy and the contact resistance between the transparent oxide conducting layer and the Al alloy are required to be low.

When a layered structure was used, for example, for the scanning line or the signal line of a liquid crystal display device, the conventional layered structure had no problem concerning the contact resistance between the Al alloy and the transparent oxide conducting layer, since the wiring width was long and wide and the area in contact with the transparent oxide conducting layer was broad. However, as the liquid crystal panels have become high-resolution, wirings have become narrow-pitched, picture cells have become of high aperture ratio, and wirings have become thinner, the contact resistance between the Al alloy and the transparent oxide conducting layer has grown to be no longer a matter negligible.

Also, in patterning the layered structure formed on the substrate and made of the Al alloy and the transparent oxide conducting layer, the use of developing solution for photoresist (for example, a solution consisting primarily of TMAH [=tetramethyl ammonium hydride]) involved galvanic corrosion taking place in the Al alloy causing Al alloy to come off from the ITO film. It is conceived that such galvanic corrosion was caused because there was a large difference in the electrode potentials between the aluminum in electrolyte fluid (for example, the above developing solution) and the transparent oxide conducting layer.

On the other hand, addition of alloy content to the aluminum is one way to reduce electrical contact resistance, but in that case, there is a problem in that the electrical resistance of the Al alloy layer itself is compelled to increase. Particularly when it is used for scanning lines and signal lines, the problem is that delay is caused in signal transfer speed. Therefore, there is a limit in the method of adding alloy content to the aluminum.

SUMMARY OF THE INVENTION

In view of the foregoing, the present invention intends to provide a layered structure which connects to Al alloy directly without causing increase of the electrical contact resistance between the transparent oxide conducting layer and the Al alloy layer and which keeps the resistance in wiring low and suffers little from galvanic corrosion of the aluminum in electrolyte fluid, and the manufacturing method of such layered structure.

According to one aspect of the present invention, the manufacturing method of the layered structure that has been able to provide solution to the abovementioned problems is a method to produce a layered structure wherein the transparent oxide conducting layer and the Al alloy layer are directly connected to each other. The manufacturing method includes: a first process of forming the transparent oxide conducting layer on the substrate; a second process of forming, on the transparent oxide conducting layer, the Al alloy layer containing alloy content having less ionization tendency than aluminum; and a third process of heating the above Al alloy layer for the purpose of making alloy content deposited on the interface at a temperature higher than the deposition temperature of the intermetallic compound composed of the above alloy content for the purpose of making alloy content deposited on the interface.

In the manufacturing method mentioned above, it is recommended to have the heating in the third process carried out after the second process has completed.

In the above manufacturing method, it is recommended to have the heating in the third process carried out during the progression of the second process. Also, the heating in the third process may as well be carried out both during and after the progression of the second process.

In the above manufacturing method, the above alloy content having less ionization tendency than aluminum is Ni, and it is preferable that the Ni content is set at 0.1-6 atomic % and the heating temperature in the above third process is set at 200° C. or higher.

According to another aspect of the present invention, the layered structure that has been able to provide a solution to the above-mentioned problems is a wiring structure with the transparent oxide conducting layer formed on the substrate and with the Al alloy layer directly connected to the transparent oxide conducting layer, the above Al alloy layer containing alloy content having less ionization tendency than aluminum, while the intermetallic compound composed of aluminum and the above alloy content being deposited on the interface of the transparent oxide conducting layer.

It is recommended that in the above layered structure, the above alloy content having less ionization tendency than aluminum should be Ni, and the contained amount of Ni should be 0.1-6 atomic %.

According to the aspects of the present invention, the electrical contact resistance between the transparent oxide conducting layer and the Al alloy layer can be reduced without need of increasing alloy content added to the Al alloy layer, while preventing galvanic corrosion. This helps increase yield rate and enhance image quality of display devices.

DESCRIPTION OF THE PREFERRED EMBODIMENTS

Figure 1:
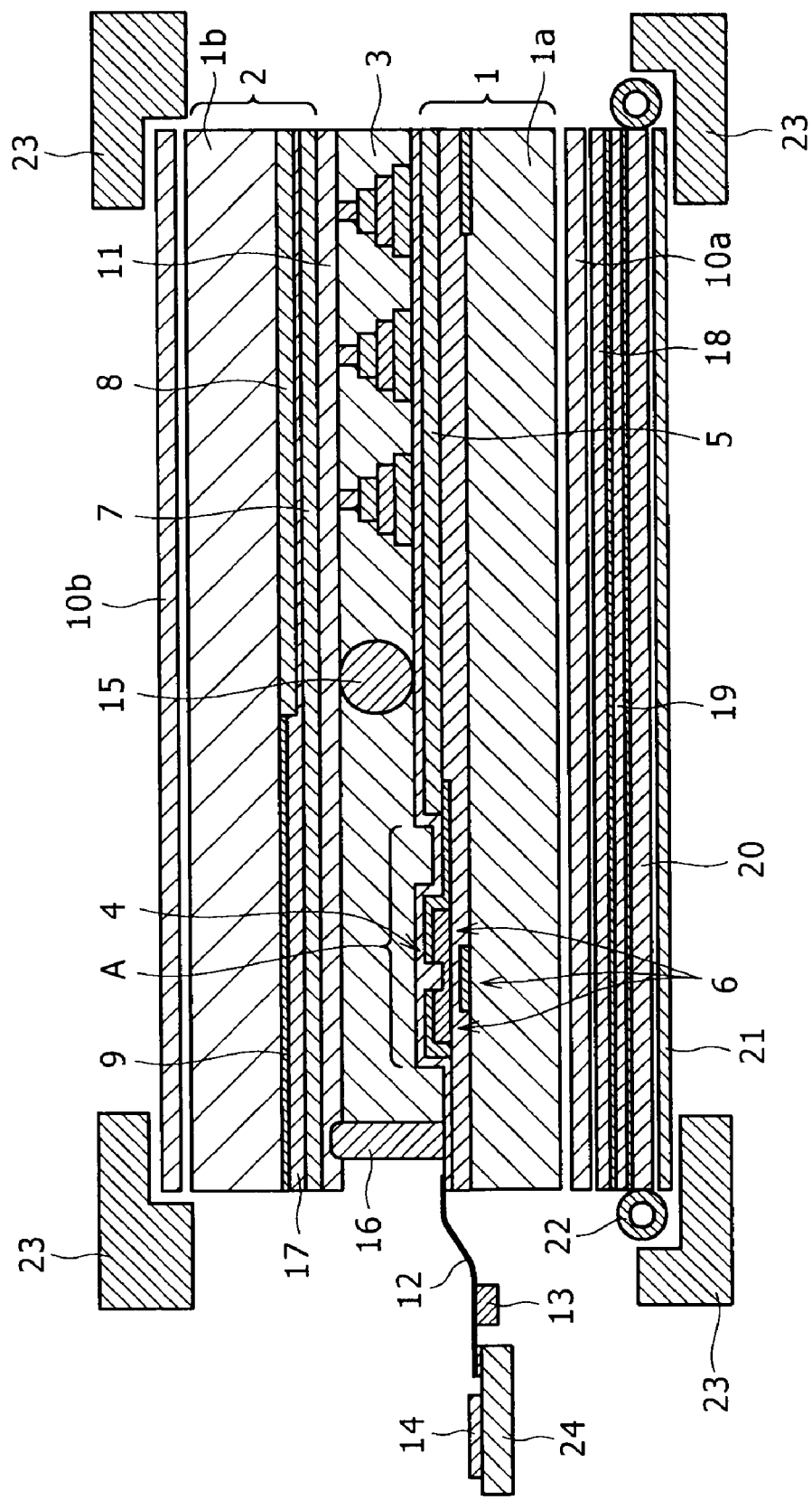
FIG. 1 is a schematic enlarged cross-sectional view showing the configuration of a representative liquid crystal display to which amorphous silicon TFT substrates are applied.

Referring to the drawings, explanation is now made below of the layered structure and the manufacturing method thereof according to an embodiment of the present invention. For the sake of explanation about the locations where the layered structure according to an embodiment of the present invention is preferredly applicable, a liquid crystal display device is taken as an example, and explanation is made step by step starting from an overall picture.

In the following, the layered structure and the manufacturing method thereof are explained with an amorphous silicon TFT substrate or polysilicon TFT substrate taken as a representative example. However, the present invention is not limited but is possible to be put into practice with proper modifications within the range conforming to the intent described above and below. The layered structure in the present preferred embodiment may as well be applicable, for instance, to reflecting electrodes in reflective liquid crystal display devices, TAB connection electrodes used for external I/O of signals, storage capacitor electrodes, and common electrodes.

1. Liquid Crystal Display Device

In reference to FIG. 1, explanation is made of the configuration and operation principles of a representative liquid crystal display applied to an active matrix type liquid crystal display device. For explanation here, a TFT substrate of amorphous silicon hydride (which may be called as an "amorphous silicon TFT substrate" hereinafter) has been taken up as a representative example of active semiconductor layer. However, the active semiconductor layer is not limited to this material referred to above but may as well be a polysilicon TFT substrate.

As shown in FIG. 1, the liquid crystal display device 100 includes the TFT substrate 1, the counter substrate 2 placed opposite to the TFT substrate 1, the liquid crystal layer 3 which, located in between the TFT substrate 1 and the counter substrate 2, functions as the optical modulation layer. The TFT substrate 1 holds the TFT 4, the transparent pixel electrode 5, and the wiring section 6 including scanning lines and signal lines, all arranged on the insulative glass substrate 1a. The transparent pixel electrode 5 is composed of transparent oxide conducting layer such as the ITO layer of indium oxide ($In_2O_3$) including approx. 10% by mass of tin oxide (SnO). The TFT substrate 1 is driven by the driver circuit 13 and the control circuit 14, both the circuits being connected to each other by means of the TAB tape 12.

The counter substrate 2 has, on the side facing toward the TFT substrate 1, the common electrode 7 formed on the entire surface of the insulative glass substrate 1b, the color filter 8 placed in the position opposing to the transparent pixel electrode 5, and the light shielding layer 9 placed in the position opposite to the TFT 4 and the wiring section 6 on the TFT substrate 1. The counter substrate 2 further retains the orientational layer 11 to keep the liquid crystal molecules contained in the liquid crystal layer 3 oriented in a prescribed direction.

On the respective outside (the side opposite to the liquid crystal layer) of the TFT substrate 1 and the counter substrate 2, there are disposed polarizing plates 10a and 10b.

In the liquid crystal display device 100, the orientational direction of the liquid crystal molecules in the liquid crystal layer 3 is controlled and the light passing through the liquid crystal layer 3 is modulated by the electrical field produced between the counter electrode 2 and the transparent pixel electrode 5. By the above manner, the amount of light transmitting through the counter substrate 2 is controlled to enable image to be displayed.

2. TFT Substrate

Figure 2:
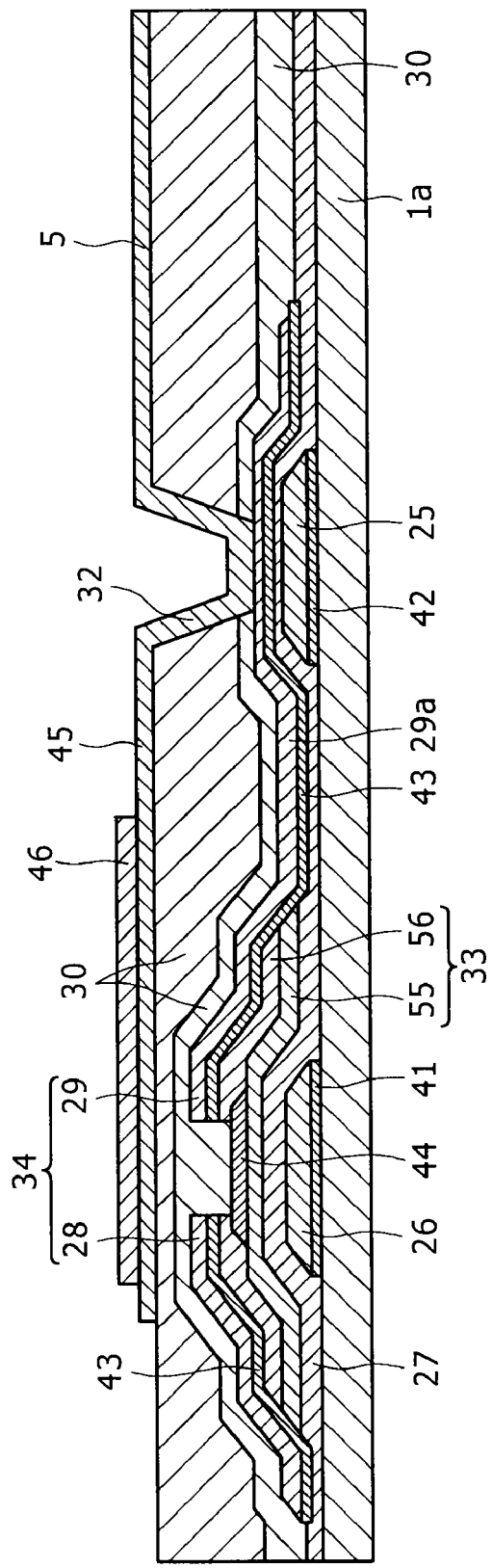
FIG. 2 is a schematic cross-sectional view showing the configuration of TFT substrates relating to the embodiments of the present invention.

Next, with reference to FIG. 2, explanation is made of the configuration and operational principles of the conventional amorphous silicon TFT substrate preferredly used for the liquid crystal display device. FIG. 2 is an enlarged illustration of the core portion marked "A" in FIG. 1.

As shown in FIG. 2, the transparent oxide conducting layer 42 and the scanning line (the gate wiring) 25 are layered on the glass substrate 1a. The transparent oxide conducting layer 41 and the gate electrode 26 are also layered. The scanning line 25 is electrically connected to the gate electrode 26 to control on and off of the TFT.

The gate insulation layer (silicon nitride layer) 27 is formed so as to cover the gate electrode 26. With the gate insulation layer 27 underneath, the signal line (source-to-drain wiring) 34 is formed in such a way as to intersect the scanning line 25, and a part of the signal line 34 also functions as the source electrode 28 of the TFT. Above the gate insulation layer 27, the amorphous silicon channel layer (active semiconductor layer) 33, the signal line (source-to-drain wiring) 34, and the interlayer insulating silicon nitride layer (passivation layer) 30 are formed in the order as described. This type of TFT is generally called a bottom gate type.

The amorphous silicon channel layer 33 is composed of an intrinsic layer 55 to which phosphorus (P) is not doped (which may as well called as "i" layer or non-doping layer) and an doped layer 56 (or also called as "n" layer) to which P is doped. The transparent pixel electrode 5 formed, for example, by the ITO layer which includes SnO in $In_2O_3$, is arranged in the pixel region over the gate insulation layer 27. The drain electrode 29 of the TFT is electrically connected to the transparent pixel electrode 5 with the drain wiring section 29a extending from the drain electrode 29.

Through the scanning line 25, the gate voltage is supplied to the gate electrode 26 turning the TFT 4 into on status, and the driving voltage supplied in advance to the signal line 34 is then supplied via the source electrode 28 and the drain electrode 29 to the transparent pixel electrode 5. When a prescribed level of driving voltage is supplied to the transparent pixel electrode 5, difference in electrical potential is to be caused between the transparent pixel electrode 5 and the counter electrode 2 as explained in respect to FIG. 1, resulting that the liquid crystal molecules in the liquid crystal layer 3 are oriented thus inducing optical modulation to occur.

In the upper region of the TFT, the reflective layer 46 composed of the Al alloy layer is formed on the transparent oxide conducting layer 45 which is a prolonged portion of the oxide transparent pixel electrode 5 to effectively reflect the light coming from the upside.

3. Layered Structure

In exemplification of the layered structure according to an embodiment of the present invention, the following can be listed: the layered structure of the transparent oxide conducting layer 42 and scanning line 25; the layered structure of the transparent oxide conducting layer 41 and gate electrode 26; the layered structure of the transparent oxide conducting layer 43 and signal line 34 (source electrode 28, drain electrode 29, or drain wiring section 29a); and the layered structure of the transparent oxide conducting layer 45 and reflective layer 46.

The transparent oxide conducting layer is at least a layer through which visible light is transmissible; for example, indium tin oxide (ITO: indium oxide ($In_2O_3$) containing tin oxide (SnO)), indium zinc oxide (IZO: indium oxide added with zinc oxide), and other layers the major component of which is a metal oxide having electrical resistance of 1Ω·cm or less.

The scanning line 25, gate electrode 26, signal line 34 (source electrode 28, drain electrode 29, and drain wiring section 29a), and reflective layer 46 are respectively composed of aluminum alloy layer. Al alloy layer contains aluminum as the major component and also contains alloy components having less ionization tendency than aluminum (e.g., Ag, Cu, or more preferably Ni).

By making the Al alloy layer contain Ni or other alloy components, it becomes possible to reduce electrical contact resistance between the Al alloy layer and the transparent oxide conducting layer. To enable such reducing effect to exhibit efficiently, it is preferable to keep the contained amount of Ni, etc., at a level of 0.1 atomic % or more. Preferably it should be increased to 0.2 atomic % or higher, or more preferably, it should be increased further to 0.5 atomic % or higher. On the other hand, if alloy element is excessive in contained amount, it will cause the electric resistivity of Al alloy layer to rise. Therefore, it is preferable that the contained amount of the alloy element should be restrained at 6 atomic % or lower; or more preferably at 3 atomic % or lower, or yet more preferably at 1 atomic % or lower.

The Al alloy layer is allowed to add as its other alloy components heat-resistance enhancement elements (at least one kind of Nd, Y, Fe, Co, Ti, V, Zr, Nb, Mo, Hf, Ta, Mg, Cr, Mn, Ru, Rh, Pd, Ir, Pt, La, Gd, Tb, Dy, Sr, Sm, Ge, and Bi at a contained level of 0.1-0.5 atomic %, or preferably at 0.2-0.35 atomic %) combined all together.

Figure 3:
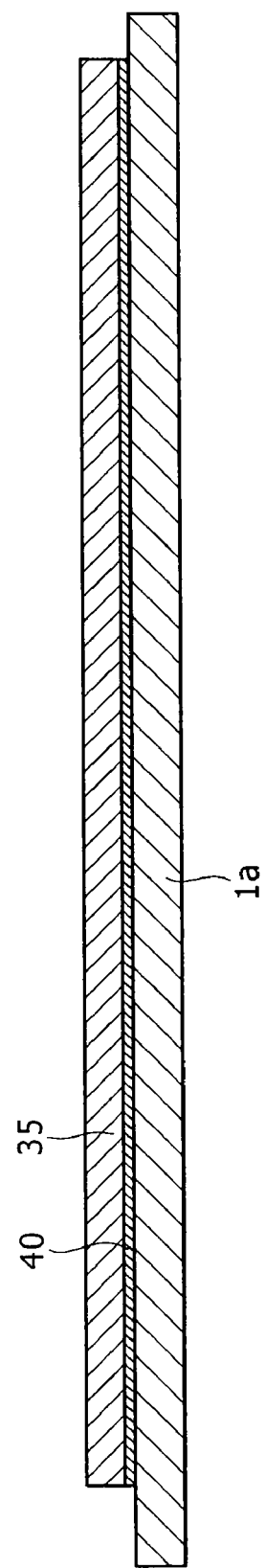
FIG. 3 is an explanatory drawing illustrating an example of the manufacturing process of TFT substrates shown in FIG. 2.
Figure 4:
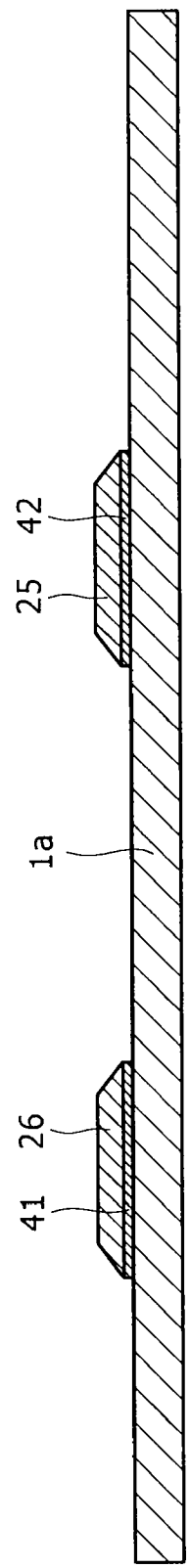
FIG. 4 is an explanatory drawing illustrating an example of the manufacturing process of TFT substrates shown in FIG. 2.
Figure 5:
FIG. 5 is an explanatory drawing illustrating an example of the manufacturing process of TFT substrates shown in FIG. 2.
Figure 6:
FIG. 6 is an explanatory drawing illustrating an example of the manufacturing process of TFT substrates shown in FIG. 2.

Referring to the set of FIG. 3 and FIG. 4 and the set of FIG. 5 and FIG. 6, explanation is made of the layering process for the transparent oxide conducting layers 41, 42 to the scanning line 25 of Al alloy layer and the gate electrode 26.

First, as shown in FIG. 3, the transparent oxide conducting layer 40 (the layer is as thick as 100 nm) is formed on the glass substrate 1a (the first process), and second, on the transparent oxide conducting layer 40, an Al alloy layer including, for example, nickel (Ni) and lanthanum (La), that is, an Al alloy layer (Al—Ni—La alloy layer) 35 (thickness of layer: 200 nm) is formed into a layered structure (the second process). Then, the above layer formation is heated at 200° C., a temperature above the deposition temperature of an Al—Ni intermetallic compound, to make Al—Ni intermetallic compound deposited (the third process).

To separate out the intermetallic compound of aluminum and nickel, it is necessary to raise the heating temperature to 200° C. or over. Preferably it should be 250° C. The upper limit of the heating temperature is not particularly specified, but to prevent occurrence of hillock of the Al alloy layer 35, it is preferable to set the heating temperature at 350° C. or below, or more preferable at 300° C. or below.

Then, by the lithography method and etching, patterning of the Al—Ni—La alloy layer 35 and the transparent oxide conducting layer 40 is to be carried out to build up the layered structure of the transparent oxide conducting layer 41 and 42, the scanning line 25, and the gate electrode 26.

When the layered structure formed as above is subjected to annealing at a proper temperature, the deposit of intermetallic compound becomes massed together on the interface of the substrate. The density of nickel, which has relatively small ionization tendency, increases on the interface, while difference in contact potential decreases between the ITO layer and the IZO layer. Therefore, the galvanic corrosion attributable to the developing solution and the etchant, both used for the operation of the lithography method, becomes less likely to occur.

As the forming method of the layered structures for the transparent oxide conducting layers 41 and 42, the scanning line 25, and the gate electrode 26, it may as well be practicable to follow another method shown in FIG. 5 and FIG. 6, wherein the transparent oxide conducting layers 41 and 42 are patterned out of the transparent oxide conducting layer 40 and formed into the Al—Ni—La alloy layers 35. Also in this case, annealing at 200° C. for one hour should be applied to the Al—Ni—La alloy layer 35 to separate out the intermetallic compound of aluminum and nickel, and then the Al—Ni—La alloy layer 35 is made to undergo patterning by the lithography method and etching to form the scanning line 25 and the gate electrode 26.

The ITO layer composing the transparent oxide conducting layers 40, 41, and 42, before heated, is in amorphous state and is soluble in the etchant for aluminum containing phosphoric acid as a major ingredient, but since it crystallizes if heated at 200° C., it has selectivity toward the etchant for aluminum. Therefore, in performing etching of the Al—Ni—La alloy layer 35 as shown in FIG. 6, it is possible to prevent unnecessary etching action from proceeding to the transparent oxide conducting layers 41 and 42 the formation of which has already been completed.

The IZO layer can be used in case etching selectivity is not required. Any transparent oxide conducting layers other than the ITO layer, even if it has selectivity toward the etchant for aluminum, can also be used without problem.

4. Example

Electrode Potential

Confirmation of electrode potential of each material was made by short-circuiting Al alloy layer and other objective electrodes for measurement with silver—silver chloride reference electrode in TMAH (tetramethyl-ammonium hydroxide) 2.38 wt % aqueous solution and measuring differences of potentials with a voltmeter. The results turned out as follows: the electrode potential of the poly-ITO layer was −0.2V; the electrode potential of the Al alloy without separating out Ni was −1.3V; the electrode potential of Ni was −0.25V; furthermore, the electrode potential of Al—Ni intermetallic compound ($Al_3Ni$) was −1.0V, representing that the difference in potential between this value and the ITO layer became narrower, the reason why the galvanic corrosion became less likely to occur.

Profile of Constituents

Figure 7:
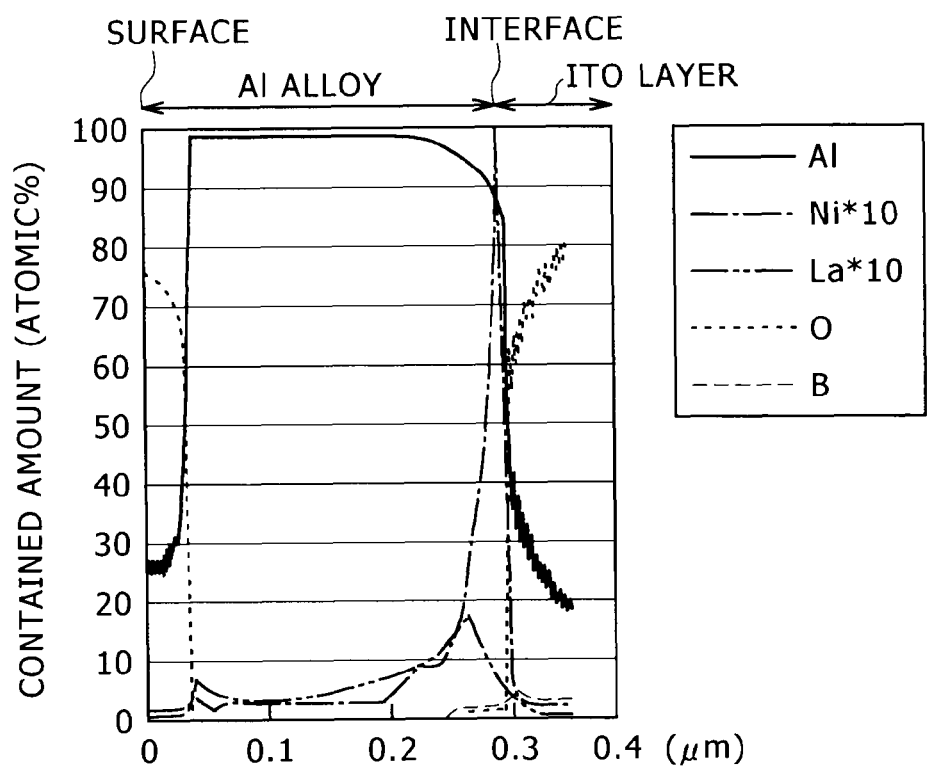
FIG. 7 is a profile showing concentration of Ni included in Al—Ni—La alloy layer along the depth direction of the alloy.

FIG. 7 is a profile showing concentration toward the depth direction of the alloy constituents such as Ni and others included in an Al—Ni—La alloy layer after heat treatment (namely, after Ni is separated out). Measurement was conducted by using GD-OES (Glow Discharge Optical Emission Spectroscopy). In regard to the contained amount of Ni and La, tenfold value of actual contained amount was plotted to facilitate easy reading. From FIG. 7, it is clear that the Ni concentration is high in the interface with the ITO layer.

Electrical Contact Resistance

Figure 8:
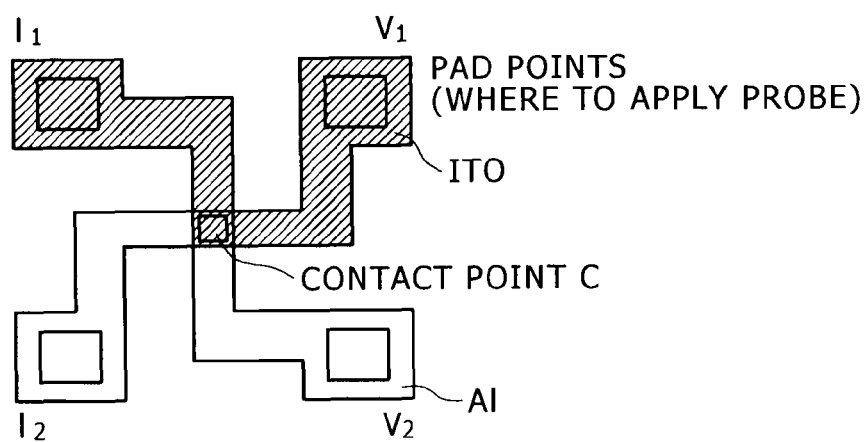
FIG. 8 is a drawing showing the Kelvin pattern (TEG pattern) used for measurement of electrical contact resistance between the Al alloy layer and the ITO layer.

By means of the four-terminal method using the Kelvin pattern shown in FIG. 8, measurement was made of electrical contact resistance when an Al—Ni—La alloy layer with Ni added at 2 atomic %, was directly connected to the ITO layer. As the result, the electrical contact resistance was as sufficiently low as 100Ω even though the contact area was 10 μm square between the Al—Ni—La alloy layer and the ITO layer. The electrical contact resistance was checked by passing an electric current between the ITO layer and the Al alloy layer and measuring voltage drop between the ITO and the Al alloy at different terminals. In concrete terms, the current "I" was passed between $I_1$-$I_2$ in FIG. 8, and the voltage "V" between $V_1$-$V_2$, was monitored, thus to obtain the electrical contact resistance "R" of the contact portion "C" from the formula [$R=(V_1-V_2)/I_2$].

Peel-off Test

Figure 9:
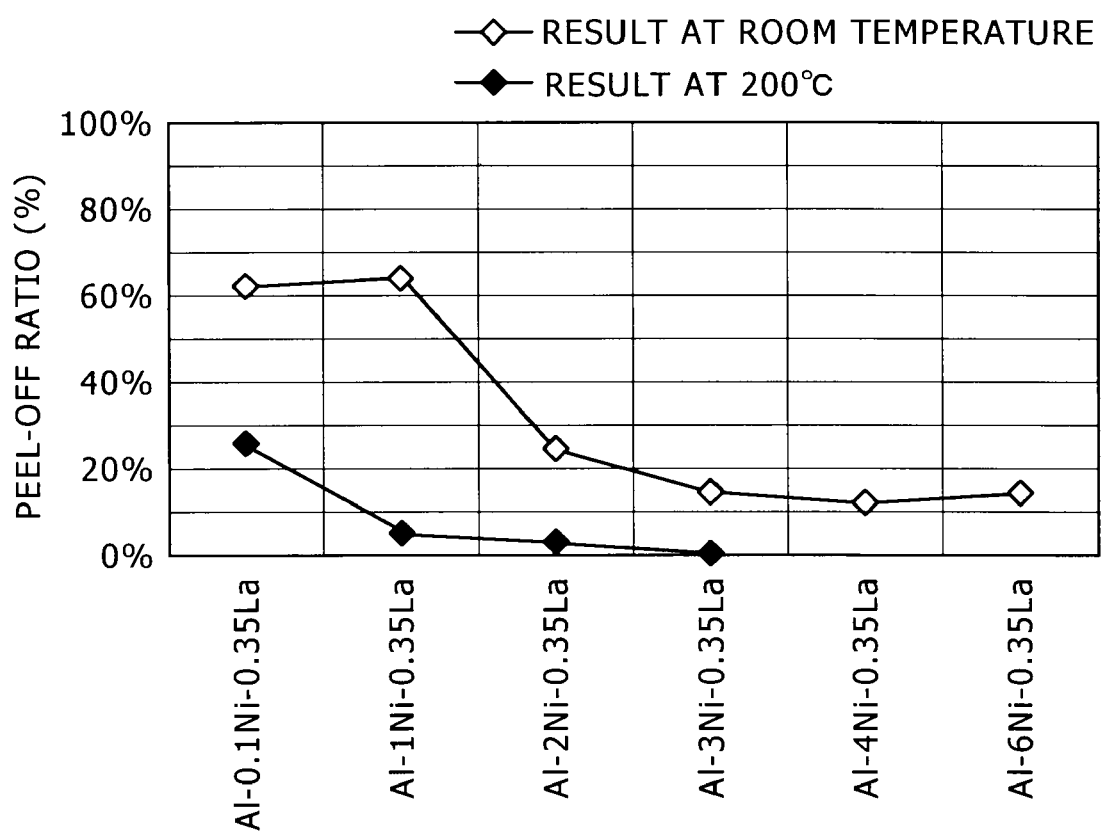
FIG. 9 is a drawing showing peel-off ratio of the Al alloy layer (against the ITO layer).

FIG. 9 shows the peel-off ratios of the Al alloy layer peeling off the ITO layer in case the Al alloy layer was formed at room temperature and also in case the Al alloy layer was formed at 200° C. Evaluation of peel-off was conducted in the following manner: first, a sample of Al alloy layer containing Ni and La and formed on a ITO layer was coated with photoresist and exposed to ultraviolet ray; second, the sample was treated for image development in a developing solution containing TMAH 2.38%; third, the sample after the foregoing treatment was observed under the microscope to find out if there is any peel-off. Peel-off ratio counting was made in the following manner: first, the image in the photomicrograph was divided into 5 μm square mesh; second, each square was scrutinized, and any square which has any peel-off no matter how small it may be was counted as peel-off for the purpose of digitalization. The test was conducted by varying the contained amount of Ni from 0.1 atomic % to 6 atomic %. The contained amount of La was 0.35 atomic %. The Al alloy layer used for sample had a layer thickness of 100 nm, and the ITO layer had a thickness of 40 nm.

Figure 11:
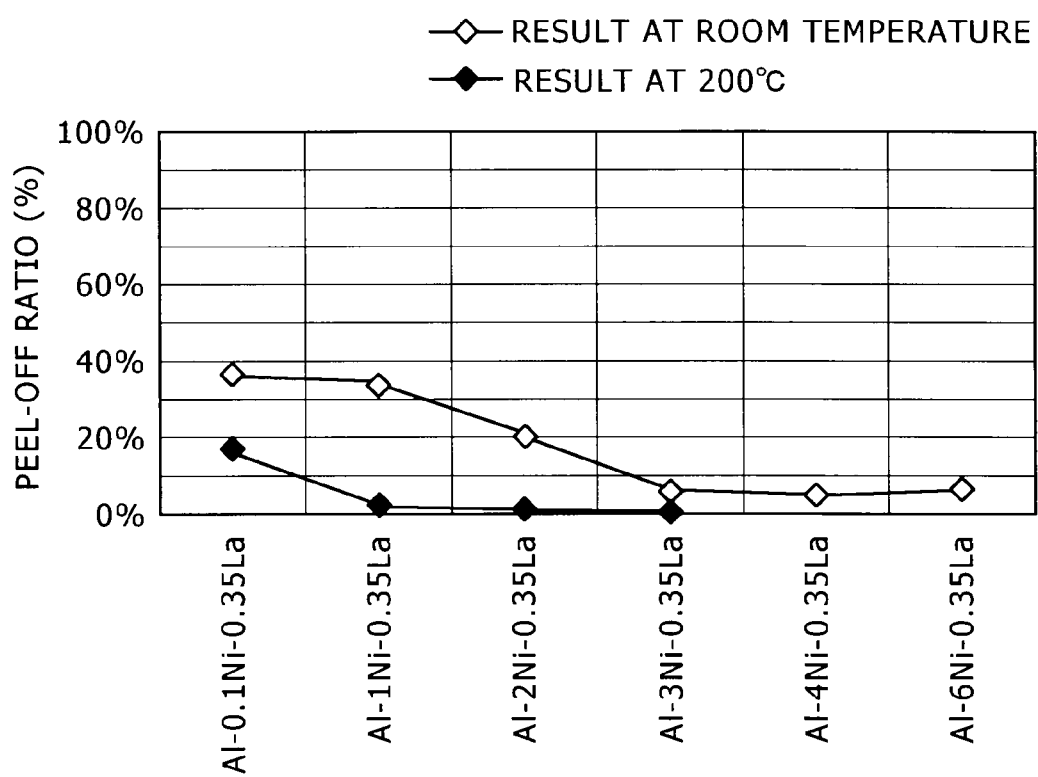
FIG. 11 is a drawing showing peel-off ratio of the Al alloy layer (against the IZO layer).

FIG. 11 shows the peel-off ratio on the same conditions but with the test-piece of IZO layer as a replacement of the ITO layer. Peel-off ratio is shown for the case where the Al alloy layer formed at the room temperature was peeled off from the IZO layer and also for the case where the Al alloy layer formed at 200° C. was tested on the same other conditions.

As FIG. 9 and FIG. 11 indicate, the peel-off ratio in the case of the Al alloy formed at 200° C. becomes extremely lower than in the case of the Al alloy formed at room temperature. This means that much improvement has been realized in terms of resistance to galvanic corrosion.

Observation of the peeled surface and cross section has proved that some correlation was found between the peel-off ratio and the progression rate of corrosion in the interface of the Al alloy layer and the ITO or IZO layer. That is, the peel-off in the interface between the Al alloy layer and the ITO or IZO layer, which was not seen for the test piece of the layer formed with heating at 200° C., was observed for the test piece formed at room temperature, to an extent of 10-60% by the ratio of apparent area.

Figure 10:
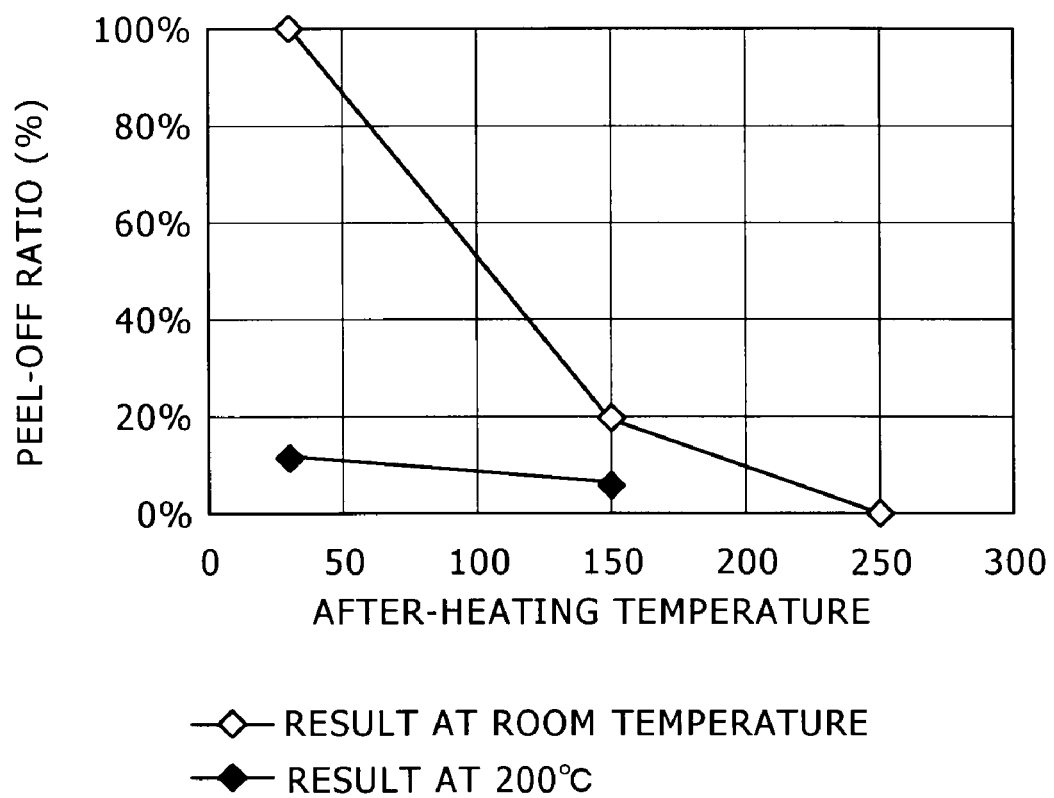
FIG. 10 is a drawing showing peel-off ratio of the Al alloy layer (against the ITO layer) after heat treatment.
Figure 12:
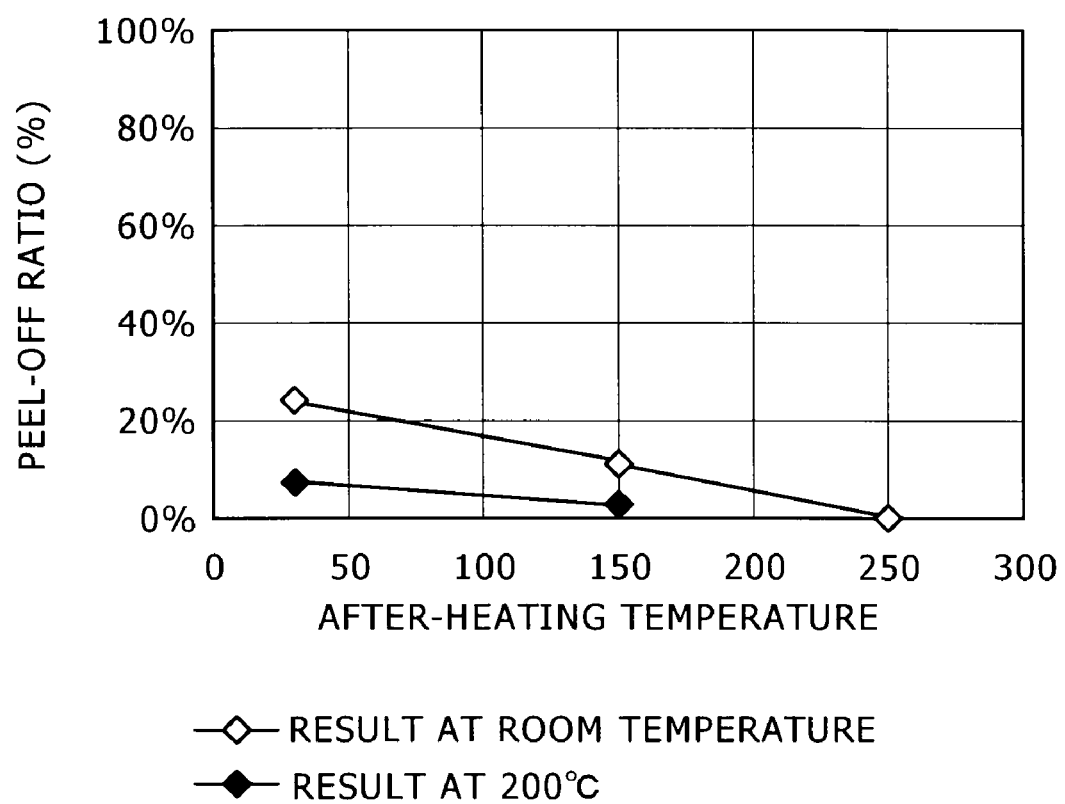
FIG. 12 is a drawing showing peel-off ratio of the Al alloy layer (against the IZO layer) after heat treatment.

Further, test was conducted of the Al alloy layer thus fabricated. FIG. 10 shows the peel-off ratio of the Al alloy layer which was formed on the ITO layer under heating at 200° C. and, after that, processed by additional heating at varied temperature ranging from room temperature to 250° C. FIG. 12 shows the result of similar test using the ITO layer in place of the IZO layer.

As is clear from FIG. 10 and FIG. 12, peel-off ratio becomes lower if the Al alloy layer after formed is subjected to heat treatment at or over 200° C. If the Al alloy layer whose formation was made at room temperature (marked "◇" in the drawing) is heat-treated at 250° C. after formation, it has been proven that very few number of peel-off does occur to the Al alloy layer. This means that much improvement has been realized in terms of resistance to galvanic corrosion.

In case the Al alloy layer after formation is used as the gate electrode 26, the gate insulation layer 27 and the active semiconductor layer 33 are to be formed additionally on the gate electrode 26.

It is also possible to make the layered structure of the transparent oxide conducting layer and the Al alloy layer applied to the use as the source-drain line 34. In that case, the transparent oxide conducting layer 43 of the source-drain line 34 can be drawn out as it is and used as the pixel electrode (not shown in the drawing), thereby enabling the process to become simplified.

What is claimed is:

1. A layered structure comprising
a transparent oxide conducting layer directly connected on a substrate, and
an Al alloy layer directly connected to said transparent oxide conducting layer,
wherein
said Al alloy layer comprises an intermetallic compound comprising aluminum, and an interface connecting said Al alloy layer with said transparent oxide conducting layer, wherein said interface comprises at least one alloy component having less ionization tendency than aluminum.

2. The layered structure according to claim 1, wherein
said at least one alloy component having less ionization tendency than aluminum is Ni; and
the amount of Ni is 0.1-6 atomic% based on the alloy.

3. The layered structure according to claim 1, wherein the substrate is a glass substrate.

4. The layered structure according to claim 1, wherein said at least one alloy component having less ionization tendency than aluminum is at least one selected from the group consisting of Ag, Cu, and Ni.

5. The layered structure according to claim 1, wherein a total amount of said alloy component is 3 atomic % or less based on the alloy.

6. The layered structure according to claim 1, wherein the alloy layer further comprises at least one heat-resistant element selected from the group consisting of Nd, Y, Fe, Co, Ti, V, Zr, Nb, Mo, Hf, Ta, Mg, Cr, Mn, Ru, Rh, Pd, Ir, Pt, La, Gd, Tb, Dy, Sr, Sm, Ge and Bi.

7. The layered structure according to claim 6, wherein the at least one heat-resistant element is present in an amount of from 0.1 to 0.5 atomic %.

8. The layered structure according to claim 6, wherein the at least one heat-resistant element is present in an amount of from 0.2- 0.35 atomic %.

9. The layered structure according to claim 1, wherein a thickness of the transparent oxide conducting layer is less than 100 nm.

10. The layered structure according to claim 1, wherein the transparent oxide conducting layer comprises indium tin oxide.

11. The layered structure according to claim 1, wherein the transparent oxide conducting layer comprises indium zinc oxide.

12. The layered structure according to claim 1, wherein a major component of the transparent oxide conducting layer is a metal oxide having an electrical resistance of $1\,\Omega\cdot\text{cm}$ or less.

13. A method of manufacturing the layered structure of claim 1, the method comprising
a first process of forming a transparent oxide conducting layer on a substrate,
a second process of forming, on said transparent oxide conducting layer, an Al alloy layer comprising at least one alloy component having less ionization tendency than aluminum, and
a third process of heating said Al alloy layer at a temperature equal to or higher than the temperature at which an intermetallic compound between aluminum and said at least one alloy component can be separated out.

14. The method of manufacturing according to claim 13, wherein the heating of said third process is performed after said second process has been completed.

15. The method of manufacturing according to claim 14, wherein the heating of said third process is performed during progression of said second process.

16. The method of manufacturing according to claim 15, wherein
said at least one alloy component having less ionization tendency than aluminum is Ni;
the amount of Ni is 0.1-6 atomic% based on the alloy; and
the heating temperature in said third process is 200° C. or higher.

17. The method of manufacturing according to claim 14, wherein
said at least one alloy component having less ionization tendency than aluminum is Ni;
the amount of Ni is 0.1-6 atomic% based on the alloy; and
the heating temperature in said third process is 200° C. or higher.

18. The method of manufacturing according to claim 13, wherein the heating of said third process is performed during progression of said second process.

19. The method of manufacturing according to claim 18, wherein
said at least one alloy component having less ionization tendency than aluminum is Ni;
the amount of Ni is 0.1-6 atomic% based on the alloy; and
the heating temperature in said third process is 200° C. or higher.

20. The method of manufacturing according to claim 13, wherein
said at least one alloy component having less ionization tendency than aluminum is Ni;
the amount of Ni is 0.1-6 atomic% based on the alloy; and
the heating temperature in said third process is 200° C. or higher.

* * * * *